(12) United States Patent
DelGaudio et al.

(10) Patent No.: US 7,685,027 B2
(45) Date of Patent: Mar. 23, 2010

(54) METHOD AND SYSTEM FOR ENTERPRISE-WIDE MIGRATION

(75) Inventors: Carol I. DelGaudio, Williston, VT (US); Scott D. Hicks, Underhill Center, VT (US); William M. Houston, Essex Junction, VT (US); Victoria A. Locke, Fishkill, NY (US); James A. Martin, Jr., Endicott, NY (US); Douglas G. Murray, Johnson City, NY (US); Diane C. Rauch, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 1349 days.

(21) Appl. No.: 10/728,520

(22) Filed: Dec. 4, 2003

(65) Prior Publication Data

US 2005/0125522 A1 Jun. 9, 2005

(51) Int. Cl.
*G06Q 10/00* (2006.01)
(52) U.S. Cl. .................. 705/28; 707/204; 707/205
(58) Field of Classification Search .............. 705/28; 709/224; 707/1, 203, 204, 100, 10, 104.1
See application file for complete search history.

(56) References Cited

U.S. PATENT DOCUMENTS

| | | | | |
|---|---|---|---|---|
| 5,678,044 A | * | 10/1997 | Pastilha et al. | 707/104.1 |
| 5,930,806 A | * | 7/1999 | Taira et al. | 707/204 |
| 6,269,382 B1 | * | 7/2001 | Cabrera et al. | 707/204 |
| 6,496,977 B1 | | 12/2002 | Hamilton, II et al. | |
| 6,615,166 B1 | * | 9/2003 | Guheen et al. | 703/27 |
| 6,728,877 B2 | * | 4/2004 | Mackin et al. | 713/100 |
| 2002/0069213 A1 | | 6/2002 | Moslander et al. | |
| 2003/0130980 A1 | * | 7/2003 | Bell et al. | 707/1 |
| 2003/0167354 A1 | | 9/2003 | Peppers et al. | |
| 2004/0194055 A1 | * | 9/2004 | Galloway et al. | 717/101 |
| 2005/0055357 A1 | * | 3/2005 | Campbell | 707/100 |
| 2005/0086457 A1 | * | 4/2005 | Hohman | 713/1 |

* cited by examiner

*Primary Examiner*—Matthew S Gart
*Assistant Examiner*—R. S Glass
(74) *Attorney, Agent, or Firm*—Scully, Scott, Murphy & Presser, P.C.; Carl Lanuti

(57) ABSTRACT

Disclosed are a method of and system for enterprise-wide migration. The method comprises the steps of creating instances of databases for a migration, for billing and reporting, and repositing reports; gathering information on the organization, location, hardware, and software affected by said migration into a database for planning said migration; and building an inventory of the affected hardware and software using an inventory tracking tool or an inventory mailer. Migration hardware and software is ordered based on said planning and said inventory, using an inventory tool; and labor, hardware, and software as installed are tracked and billed, using said billing and reporting database. Agents for said creating, gathering, building and tracking are enabled using an agent control facility.

8 Claims, 3 Drawing Sheets

| PROCESS | TOOLSUITE COMPONENT(S) |
|---|---|
| 32 — WORKLOAD PLANNING | - ETHERNET MIGRATION MANAGER (EMM) DATABASE |
| 34 — MACHINE/CLIENT INVENTORY INFORMATION GATHERING | - ETHERNET MIGRATION MANAGER INVENTORY TRACKING (EMMIT) TOOL<br>- MOBILE ETHERNET MIGRATION MANAGER INVENTORY TRACKING (MOBILE EMMIT) TOOL<br>- ADAPTER BY EXCEPTION (ABE) TOOL |
| 36 — CUSTOMER CONTACT MANAGEMENT | - ETHERNET MIGRATION MANAGER INVENTORY TRACKING MAILER (EMMIT MAILER) DATABASE<br>- ADAPTER BY EXCEPTION MAILER (ABE MAILER) DATABASE |
| 40 — DEPLOYABLE COMPONENT INVENTORY CONTROL AND FORECASTING | - ETHERNET MIGRATION MANAGER (EMM) DATABASE |
| 42 — LABOR TRACKING AND BILLING | - ETHERNET MIGRATION MANAGER (EMM) DATABASE<br>- ETHERNET MIGRATION MANAGER BILLING AND REPORTING (EMM BAR) DATABASE |
| 44 — DEPLOYABLE COMPONENT TRACKING AND BILLING | - ETHERNET MIGRATION MANAGER (EMM) DATABASE<br>- ETHERNET MIGRATION MANAGER BILLING AND REPORTING (EMM BAR) DATABASE<br>- ETHERNET MIGRATION MANAGER REPORT REPOSITORY (EMM RR) DATABASE |
| 46 — PROJECT REPORTING AND MEASUREMENTS | - ETHERNET MIGRATION MANAGER (EMM) DATABASE<br>- ETHERNET MIGRATION MANAGER BILLING AND REPORTING (EMM BAR) DATABASE<br>- ETHERNET MIGRATION MANAGER REPORT REPOSITORY (EMM RR) DATABASE |
| 50 — DATABASE INSTANCE CREATION, MANAGEMENT AND CONFIGURATION | - EMM INSTANCE MANAGER (EMM IM) DATABASE<br>- EMM DOCUMENTATION AND RULES (EMM DR) DATABASE |
| 52 — CENTRALIZED DATA PROCESSING AGENT EXECUTION | - EMM AGENT CONTROL (EMM AC) DATABASE |
| 54 — CENTRALIZED INFORMATION ORGANIZATIONAL AND LOCATION INFORMATION | - CLIENT INVENTORY REPOSITORY (INFO.NSF) DATABASE |

FIG. 2

| TOOLSUITE COMPONENT(S) | DESCRIPTION |
|---|---|
| ETHERNET MIGRATION MANAGER (EMM) DATABASE | A LOTUS DOMINO DATABASE WHICH CONTAINS ONE ENTRY FOR EACH CLIENT AND/OR MACHINE AND/OR DEVICE BEING EFFECTED BY THE MIGRATION. EACH ENTRY CONTAINS INFORMATION ABOUT THE OWNER, LOCATION, MIGRATION STATUS, LABOR REQUIRED, COMPONENT(S) DELIVERED, ETC. |
| ETHERNET MIGRATION MANAGER INVENTORY TRACKING (EMMIT) TOOL | A WINDOWS EXECUTABLE WHICH GATHERS INFORMATION ABOUT A CLIENT AND/OR MACHINE AND/OR DEVICE AND TRANSMITS THIS INFORMATION TO EMM. |
| MOBILE ETHERNET MIGRATION MANAGER INVENTORY TRACKING (MOBILE EMMIT) TOOL | A WINDOWS EXECUTABLE (MAILABLE TO REMOTE EMPLOYEES) WHICH GATHERS INFORMATION ABOUT A CLIENT AND/OR MACHINE AND/OR DEVICE AND TRANSMITS THIS INFORMATION TO THE EMMIT MAILER. |
| ETHERNET MIGRATION MANAGER INVENTORY TRACKING MAILER (EMMIT MAILER) DATABASE | A LOTUS DOMINO DATABASE WHICH CONTAINS ONE ENTRY FOR EACH REMOTE EMPLOYEE WHO HAS BEEN SENT THE EMMIT MAILER TOOL. |
| ADAPTER BY EXCEPTION (ABE) TOOL | A WINDOWS EXECUTABLE (MAILABLE TO EMPLOYEES REQUIRING MIGRATION UPON DEMAND) WHICH GATHERS INFORMATION ABOUT A CLIENT AND/OR MACHINE AND/OR DEVICE AND TRANSMITS THIS INFORMATION TO EMM. |
| ADAPTER BY EXCEPTION MAILER (ABE MAILER) DATABASE | A LOTUS DOMINO DATABASE WHICH CONTAINS ONE ENTRY FOR EACH REMOTE EMPLOYEE WHO HAS BEEN SENT THE ABE TOOL. |
| ETHERNET MIGRATION MANAGER BILLING AND REPORTING (EMM BAR) DATABASE | A LOTUS DOMINO DATABASE WHICH CONTAINS IN ONE PLACE ALL INFORMATION FOR ALL ENTERPRISE INSTANCES OF EMM. |
| ETHERNET MIGRATION MANAGER REPORT REPOSITORY (EMMRR) DATABASE | A LOTUS DOMINO DATABASE WHICH CONTAINS ALL BILLING REPORTS AN SNAPSHOT DATA POINTS TO SUPPORT DELTA BILLING PROCESS. |
| EMM INSTANCE MANAGER (EMM IM) DATABASE | A LOTUS DOMINO DATABASE WHICH CONTAINS ONE ENTRY FOR EACH ENTERPRISE INSTANCE OF EMM. INSTANCE STATUS, GEOGRAPHY, ETC. INFORMATION IS MANAGED HERE. |
| EMM DOCUMENTATION AND RULES (EMM DR) DATABASE | A LOTUS DOMINO DATABASE WHICH CONTAINS DOCUMENTATION AND CONFIGURABLE RULES COMMON TO ALL INSTANCES OF EMM. IT IS USED TO AUTOMATICALLY DISTRIBUTE UPDATES OF THIS INFORMATION TO ALL INSTANCES. |
| EMM AGENT CONTROL (EMM AC) DATABASE | A LOTUS DOMINO DATABASE WHICH CONTAINS ONE ENTRY FOR EACH ENTERPRISE INSTANCE OF EMM. A SERIES OF DATA PROCESSING AGENTS MAY BE ENABLED/DISABLED FOR ALL ENTERPRISE INSTANCES. THIS DATABASE ALSO CONTAINS THE DATA PROCESSING AGENT SCHEDULING AND PERFORMS THE ACTUAL AGENT EXECUTIONS. |
| CLIENT INVENTORY REPOSITORY (INFO.NSF) DATABASE | A LOTUS DOMINO DATABASE WHICH CONTAINS CENTRALIZED EMPLOYEE ORGANIZATIONAL AND LOCATION INFORMATION FOR EFFICIENT USE BY OTHER TOOLSUITE COMPONENTS. |

FIG. 3

METHOD AND SYSTEM FOR ENTERPRISE-WIDE MIGRATION

BACKGROUND OF THE INVENTION

1. Field of the Invention

This invention generally relates to managing and effecting an enterprise-wide technology migration, and more specifically, to an integrated set of tools and processes to manage an enterprise-wide information technology migration.

2. Background Art

Many corporations and other enterprises have very extensive information technology or telecommunications systems or networks. These systems may include personal computers, workstations, servers, printers, monitors, data storage facilities, as well as the many software applications used on these devices and all the wiring, cabling and connectors needed to interconnect the system or network components.

From time to time, it is necessary or desirable to make extensive or fundamental changes in or to these networks or systems. For instance, an enterprise may want to migrate from one basic type of network to another. Examples of such migration include: Token-ring to Ethernet; Windows to LINUX; Dell PCs to IBM PCs; Microsoft Exchange/Outlook to Lotus Notes; and phone system migrations.

These migrations, because of the large number of pieces of equipment involved, the disparate nature of these pieces of equipment, and the complex relationships between the equipment, can be very difficult, complicated and expensive to manage. There does not exist in the prior art a configurable, integrated and end-to-end set of processes and corresponding electronic toolsuite to manage effectively large scale enterprise-wide information technology-related or telecommunications-related migrations.

SUMMARY OF THE INVENTION

An object of this invention is to provide a comprehensive and integrated set of processes and tools to manage large-scale information-related migrations.

Another object of the invention is to provide a configurable, integrated and end-to-end set of processes and corresponding electronic toolsuite to manage effectively large-scale enterprise wide information technology-related or telecommunications related migrations.

These and other objectives are attained with a method of and system for enterprise-wide migration. The method comprises the steps of creating instances of databases for a migration, for billing and reporting, and repositing reports; gathering information on the organization, location, hardware, and software affected by said migration into a database for planning said migration; and building an inventory of the affected hardware and software using an inventory tracking tool or an inventory mailer.

Migration hardware and software is ordered based on said planning and said inventory, using an inventory tool; and labor, hardware, and software as installed are tracked and billed, using said billing and reporting database. Agents for said creating, gathering, building and tracking are enabled using an agent control facility.

In a preferred embodiment, the database for planning includes one entry for each device affected by the migration, and the built inventory is transmitted into the database for planning. Also, preferably, the agent control facility includes an agent control database, and this database performs the agent executions.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 is a table listing a number of processes that may be used in the practice of this invention, and for each of these processes, one or more toolsuite components or databases, with a representative implementation noted, that may be used to carry out the process.

FIG. 3 is a table that describes in greater detail the toolsuite components and databases listed in FIG. 2.

DETAILED DESCRIPTION OF THE PREFERRED EMBODIMENTS

Figure 1:
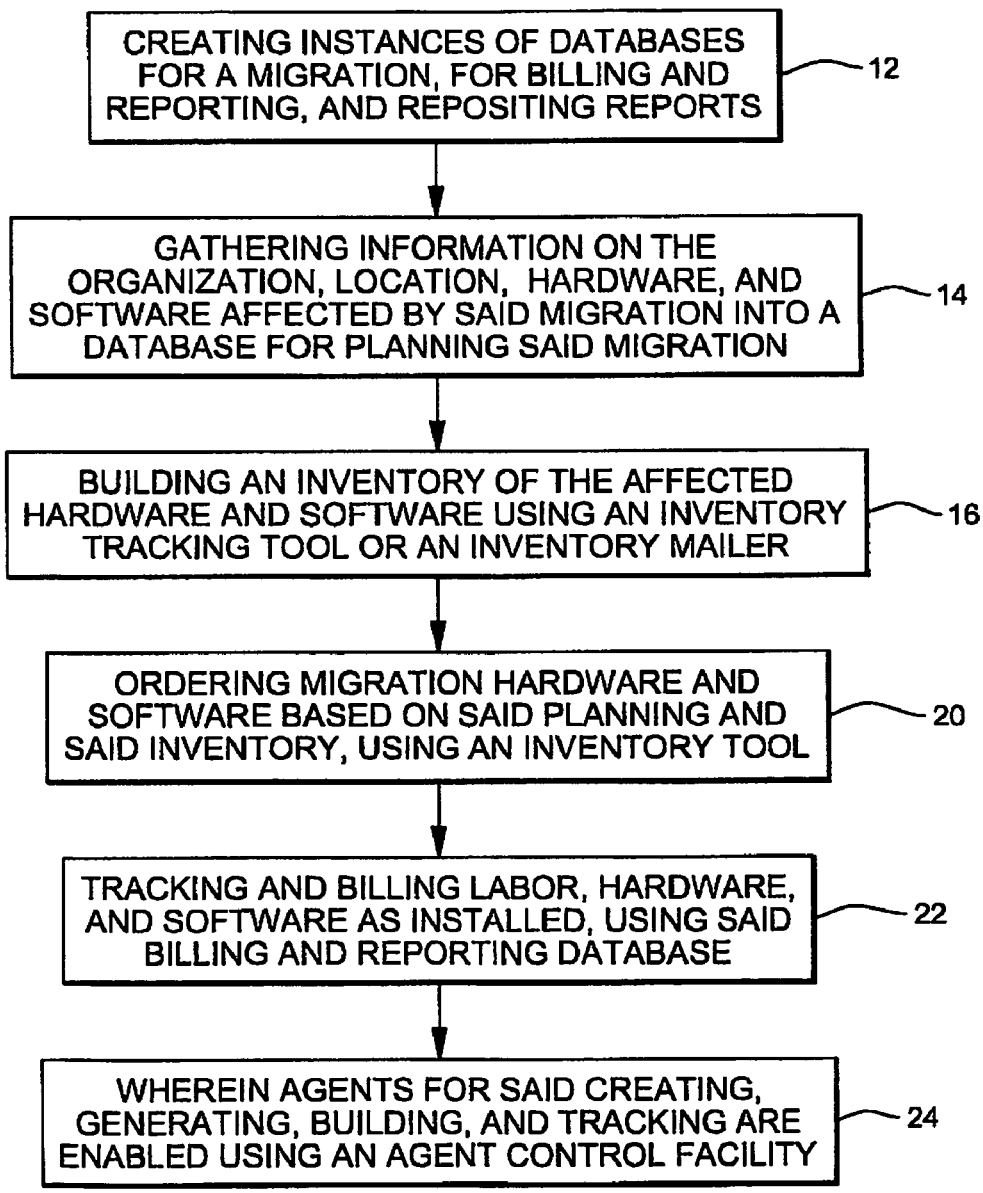
FIG. 1 is a flow chart showing an embodiment of the invention.

As previously mentioned, many enterprises have very extensive information technology or telecommunications systems or networks, and a system or network migration can be expensive, time-consuming and difficult to effect and manage. The present invention provides a configurable, integrated and end-to-end set of processes and corresponding toolsuite to manage effectively a large-scale enterprise wide information technology-related or telecommunications related migration.

FIG. 1 shows a preferred method 10 for implementing this invention. At step 12, instances of databases are created for the migration; and these databases may be used for billing and reporting, and repositing reports. At step 14, information is gathered on the organization, location, hardware and software affected by the migration, and this information is gathered into a database for purposes of planning the migration. Next, at step 16, an inventory is built of the affected hardware and software using an inventory tracking tool or an inventory mailer.

At step 20, migration hardware and software is ordered based on the above-mentioned planning and inventory, using an inventory tool. Step 22 of this method is to track and bill for labor, hardware and software as installed, using the billing and reporting database. As represented by step 24, agents are used for the creating, gathering, building and tracking, and these agents are enabled using an agent control facility.

FIG. 2 identifies processes that may be used in a specific example of the present invention. The discussion given below uses a corporate Ethernet Migration toolsuite and processes as the example of the invention.

FIG. 2 identifies ten specific processes: Workload planning 32; Machine/client inventory information gathering 34; Customer contact management 36; Deployable component inventory control and forecasting 40; Labor tracking and billing 42; Deployable component tracking and billing 44; Project reporting and measurements 46; Database instance creations management and configuration 50; Centralized data processing agent execution 52; and Client information organizational and location information 54. Each of these processes is discussed in more detail below.

Workload planning 32 includes creating an instance of a database for the enterprise. As indicated in FIG. 2, this may be done using the Ethernet Migration Manager (EMM) database.

Machine/client inventory information 34 may include, for example, information about the number, make and models of the computers and printers in the system, and this information can be collected in a number of ways. The information can be obtained by the customer, or by the service provider. Also, in some cases, the customer or the service provider may already have this information, in which case, the data can be directly imported into the database used for the migration. As represented in FIG. 2, this information can be gathered using the Ethernet Migration Manager Inventory Tracking (EMMIT) tool, the Mobile Ethernet Migration Manager Inventory Tracking (Mobile EMMT) tool, and the Adapter By Exception (ABE) tool.

The third process, customer contact management 36, shown in FIG. 2 is used to keep track of contact between the customer and the service provider. Any suitable tool or tools may be used to implement this process. For example, as indicated in FIG. 2, this process may be implemented using the Ethernet Migration Manager Inventory Tracking Mailer (EMMIT Mailer) database, and the Adapter By Exception Mailer (ABE Mailer) database.

The Deployable component inventory control and forecasting process 40 is done to determine the hardware that needs to be ordered for the customer. This hardware may include, for example, adapters, patch-cables, RIT connectors, and MDO devices. This process may be performed suing the Ethernet Migration Manager (EMM) database.

Throughout the migration process, it is necessary to keep track of the labor that was done and to bill for this labor. Process 42, Labor tracking and billing, does this. Specifically, this process may be performed using the Ethernet Migration Manager (EMM) database, and the Ethernet Migration Manager Billing and Reporting (EMM BAR) database.

The next process 44, Deployable component tracking and billing, listed in FIG. 2, is used to keep track of and to bill for the hardware components that are installed in the customer system. Any suitable tools may be used for this purpose. For instance, as shown in FIG. 2, these tools may include the Ethernet Migration Manager (EMM) database, the Ethernet Migration Manager Billing and Reporting (EMM BAR) database, and the Ethernet Migration Manager Report Repository (EMM RR) database.

Throughout the whole migration process, reports are prepared and kept track of, and the Project reporting and measurement process 46 is used to do this. In particular, FIG. 2 lists three databases that may be used in this process, including the Ethernet Migration Manager (EMM) database, the Ethernet Migration Manager Billing and Reporting (EMM BAR) database, and the Ethernet Migration Manager Report Repository (EMM RR) database.

The next process 50, Database instance creation, management and configuration, is used to manage the overall migration. In particular, this process is used to identify new instances, manage the instance database and to create new databases. Two specific databases may be used for this purpose: the EMM Instance Manager (EMM IM) database, and the EMM Documentation and Rules (EMM DR) database. This latter database is used to maintain all the pertinent data in one place.

The Centralized data processing agent execution process 52 is provided to manage all the agent programs that are used to run the instances utilized in the migration. The EMM agent control (EMM AC) database may be used for this purpose.

The tenth process listed in FIG. 2 is Client information organizational and location information 54. This process may be used to maintain information about, for example, the customer's employees. Preferably, all of this information is kept in one database, the Client Information Repository (INFO NSF) database.

FIG. 3 is a table that gives more information about the specific databases and tools referred to in FIG. 2. With reference to FIG. 3, the Ethernet Migration Manager (EMM) database 60 is a Lotus Domino database which contains one entry for each client and/or machine and/or device being affected by the migration. Each entry contains information about the owner, location, migration status, labor required, components(s) delivered, etc. The Ethernet Migration Manager Inventory Tracking (EMMIT) tool 62 is a Windows executable which gathers information about a client and/or machine and/or device and transmits this information to EMM. The Mobile Ethernet Migration Manager Inventory Tracking (Mobile EMMIT) tool 64 also is a Windows executable (mailable to remote employees) which gathers information about a client and/or machine and/or device and transits this information to the EMMIT Mailer.

The Ethernet Migration Manager Inventory Tracking Mailer (EMMIT Mailer) database 66 is a Lotus Domino database which contains one entry for each remote employee who has been sent the EMMIT Mailer tool. The Adapter By Exception (ABE) tool 70 is a Windows executable (mailable to employees requiring migration upon demand) which gathers information about a client and/or machine and/or device and transmits this information to EMM. The Adapter By Exception mailer (ABE Mailer) database 72 is a Lotus Domino database which contains one entry for each remote employee who has been sent the ABE tool.

The Ethernet Migration Manager Billing and Reporting (EMM BAR) database 74 is a Lotus Domino database which contains in one place all information from all enterprise instances of EMM. The Ethernet Migration Manager Report Repository (EMM RR) database 76 is another Lotus Domino database which contains all billing reports and snapshot data points to support delta billing process. The EMM Instance Manager (EMM IM) database 80 is a Lotus Domino database which contains one entry for each enterprise instance of EMM. Instance status, geography, etc., information is managed in this database.

The EMM Documentation and Rules (EMM DR) database 82 is a Lotus Domino database which contains documentation and configurable rules common to all instances of EMM. It is used to automatically distribute updates of this information to all instances. The EMM Agent Control (EMM AC) database 84 is another Lotus Domino database which contains one entry for each enterprise instance of EMM. A series of data processing agents may be enabled/disabled for all enterprise instances. This database also contains the data processing agent scheduling and performs the actual agent executions. The Client Information Repository (INFO.NSF) database 86 is a Lotus Domino database which contains centralized employee organizational and location information for efficient use by other toolsuite components.

As will be apparent to those of ordinary skill in the art, any suitable computer, computer system or computer network may be used to practice this invention. For example, the invention may be performed on a suitable enterprise-wide computer network. Also, depending on the specific application, a workstation or a personal computer may be used to implement the invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of managing and affecting an enterprise-wide network migration from one type of network to another type of network, the method comprising the steps of:
   creating instances of databases for an enterprise-wide network migration from one type of network to another type of network, said databases including a migration manager database, a billing and reporting database, an instance manager database, and a documentation and rules database, said migration manager database including one entry for each client, machine, and device affected by the migration, and said instance manager database containing one entry for each instance of the migration manager database, and said documentation and rules database containing documentation and configurable rules common to all instances of the migration manager database;
   gathering information on the organization, location, hardware, and software affected by said migration into the migration manager database;
   building an inventory of the affected hardware and software using an inventory tracking tool or an inventory mailer;
   determining hardware that needs to be ordered for the migration using the migration manager database;
   ordering hardware and software for the migration based on said planning and said inventory, using an inventory tool;
   tracking and billing labor, hardware, and software as installed in said another type of network, using said migration manager database and said billing and reporting database;
   using said documentation and rules database to distribute updates of the documentation and configurable rules contained in the documentation and rules database to all of the instances of the migration manager database; and
   using an agent control facility including an agent control database for enabling software agents, executed by the agent control database, for performing agent executions including said creating, gathering, building and tracking, and wherein agents are enabled for all of the created instances of databases.

2. A method according to claim 1, comprising the further step of transmitting the built inventory into the migration manager database for planning.

3. A system for managing and affecting an enterprise-wide network migration from one type of network to another type of network, the system comprising:
   means for creating instances of databases for an enterprise-wide network migration from one type of network to another type of network, said databases including a migration manager database, a billing and reporting database, an instance manager database, and a documentation and rules database, said migration manager database including one entry for each client, machine and device affected by the migration, and said instance manager database containing one entry for each instance of the migration manager database, and said documentation and rules database containing documentation and configurable rules common to all instances of the migration manager database;
   means for gathering information on the organization, location, hardware, and software affected by said migration into the migration manager database;
   means for determining hardware that needs to be ordered for the migration using the migration manager database;
   an inventory building tool for building an inventory of the affected hardware and software;
   an inventory tool for ordering migration hardware and software for the migration based on said planning and said inventory;
   means for tracking and billing labor, hardware, and software as installed in said another type of network, using said migration manager database and said billing and reporting database, and for using said documentation and rules database to distribute updates of the documentation and configurable rules contained in the documentation and rules database to all of the instances of the migration manager database; and
   an agent control facility including an agent control database for enabling software agents, executed by the agent control database, for performing agent executions including said creating, gathering, building and tracking, and wherein agents are enabled for all of the created instances of databases.

4. A system according to claim 3, further comprising means for transmitting the built inventory into the migration manager database for planning.

5. A program storage device readable by machine, tangibly embodying a program of instructions executable by the machine to perform method steps for managing and affecting an enterprise-wide migration from one type of network to another type of network, said method steps comprising:
   creating instances of databases for an enterprise-wide network migration from one type of network to another type of network, said databases including a migration manager database, a billing and reporting database, an instance manager database, and a documentation and rules database, said migration manager database including one entry for each client, machine and device affected by the migration, and said instance manager database containing one entry for each instance of the migration manager database, and said documentation and rules database containing documentation and configurable rules common to all instances of the migration manager database;
   gathering information on the organization, location, hardware, and software affected by said migration into the migration manager database;
   building an inventory of the affected hardware and software using an inventory tracking tool or an inventory mailer;
   determining hardware that needs to be ordered for the migration using eth migration manager database;
   ordering hardware and software for the migration based on said planning and said inventory, using an inventory tool;
   tracking and billing labor, hardware, and software as installed in said another type of network, using said migration manager database and said billing and reporting database;
   using said documentation and rules database to distribute updates of the documentation and configurable rules contained in the documentation and rules database to all of the instances of the migration manager database; and
   using an agent control facility including an agent control database for enabling software agents, executed by the agent control database, for performing agent executions including said creating, gathering, building and tracking, and wherein agents are enabled for all of the created instances of databases.

6. A program storage device according to claim 5, wherein said method steps comprise the further step of transmitting the built inventory into the migration manager database for planning.

7. A method according to claim 1, wherein:
  each of the entries in the migration manager database contains information about an owner, location and migration status, and
  the step of gathering information includes the step of using a migration manager inventory-tracking tool to gather information about a client, machine and device and to transmit the gathered information to the migration manager database;
  the step of building an inventory includes the steps of using a mobile migration manager inventory tracking tool to gather information about a client, machine and device, and sending the mobile migration manager inventory tracking tool to remote employees;
  the databases further includes a migration manager inventory tracking mailer database containing one entry for each remote employee who has been sent the mobile migration manager inventory tracking tool;
  the step of building an inventory further includes the steps of the mobile migration manager inventory-tracking tool transmitting the information gathered by said mobile tool to the mailer database, using an adapter by exception tool to gather information about a client, machine and device, and mailing the adapter by exception tool to employees requiring migration upon demand;
  the databases further include an adapter by exception mailer database containing one entry for each employee who has been sent the adapter by exception tool; and
  the step of building the inventory further includes the step of the adapter by exception tool transmitting to the adapter by exception mailer databases information gathered by the adapter by exception tool.

8. The method according to claim 1, wherein:
the billing and reporting database contains in one place all information from all instances of the migration manager database; and
said databases further include:
  a migration manager report repository database that contains billing reports and snapshot data points to support a delta billing process, and
  an agent control database that contains one entry for each instance of the migration manager, and contains data processing agent scheduling.

* * * * *